(12) United States Patent
Ozawa et al.

(10) Patent No.: US 10,749,332 B2
(45) Date of Patent: Aug. 18, 2020

(54) OVERCURRENT PROTECTION APPARATUS

(71) Applicants: ANDEN CO., LTD., Anjo, Aichi (JP); TOYOTA JIDOSHA KABUSHIKI KAISHA, Toyota, Aichi-ken (JP)

(72) Inventors: Kazunori Ozawa, Anjo (JP); Akira Sugiura, Anjo (JP); Shinji Oshita, Toyota (JP); Kenichi Takayoshi, Nisshin (JP)

(73) Assignees: ANDEN CO., LTD., Anjo, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 310 days.

(21) Appl. No.: 15/807,804

(22) Filed: Nov. 9, 2017

(65) Prior Publication Data

US 2018/0145501 A1    May 24, 2018

(30) Foreign Application Priority Data

Nov. 24, 2016 (JP) ................................ 2016-228011

(51) Int. Cl.
*H02H 3/08* (2006.01)
*H02H 5/04* (2006.01)
(Continued)

(52) U.S. Cl.
CPC .............. *H02H 5/041* (2013.01); *H02H 3/06* (2013.01); *H02H 3/08* (2013.01); *H02H 3/085* (2013.01);
(Continued)

(58) Field of Classification Search
USPC .......................... 361/86–87, 93.7–93.9, 103
See application file for complete search history.

(56) References Cited

U.S. PATENT DOCUMENTS

| 2011/0216448 A1 | 9/2011 | Hisada et al. |
| 2013/0063850 A1 | 3/2013 | Kawamoto et al. |

(Continued)

FOREIGN PATENT DOCUMENTS

| JP | 2001257573 A | 9/2001 |
| JP | 201114385 A | 1/2011 |

(Continued)

*Primary Examiner* — Danny Nguyen
(74) *Attorney, Agent, or Firm* — Harness, Dickey & Pierce, P.L.C.

(57) ABSTRACT

An overcurrent protection apparatus that protects, from overcurrent, a load circuit including an electric load and wiring electrically connected with each other is provided. The overcurrent protection apparatus includes: a semiconductor switching element that is configured to control energization to the load circuit; and a breaker that stops the semiconductor switching element upon detection of abnormality of overheat or overcurrent at the semiconductor switching element, the breaker having a latch operation mode of continuously stopping the semiconductor switching element even upon cancellation of abnormality detection, and a retry operation mode of canceling stoppage of the semiconductor switching element upon the cancellation of the abnormality detection. The breaker is configured to initially operate in the latch operation mode upon the abnormality detection, and then be switched to the retry operation mode after satisfaction of a predetermined condition.

3 Claims, 5 Drawing Sheets

(51) Int. Cl.
*H02H 3/06* (2006.01)
*H02M 1/08* (2006.01)
*H02M 3/155* (2006.01)
*H02H 7/22* (2006.01)
*H02H 7/00* (2006.01)
*H02H 3/05* (2006.01)

(52) U.S. Cl.
CPC ............. *H02M 1/08* (2013.01); *H02M 3/155* (2013.01); *H02H 3/05* (2013.01); *H02H 7/005* (2013.01); *H02H 7/222* (2013.01)

(56) References Cited

U.S. PATENT DOCUMENTS

2016/0204593 A1* 7/2016 Djelassi .................. H02H 3/07
　　　　　　　　　　　　　　　　　361/101
2017/0338646 A1* 11/2017 Djelassi ............... H02H 1/0007

FOREIGN PATENT DOCUMENTS

| JP | 2011-182604 A | 9/2011 |
| JP | 2013-062976 A | 4/2013 |
| JP | 2013-085443 A | 5/2013 |
| JP | 2016012972 A | 1/2016 |

\* cited by examiner

OVERCURRENT PROTECTION APPARATUS

CROSS REFERENCE TO RELATED APPLICATIONS

This application is based on Japanese Patent Application No. 2016-228011 filed on Nov. 24, 2016, the disclosure of which is incorporated herein by reference.

TECHNICAL FIELD

The present disclosure relates to an overcurrent protection apparatus that is configured to protect a load circuit from overcurrent.

BACKGROUND ART

Patent Literature 1: JP 2013-62976 A (corresponding to US 2013/0063850 A)

Patent Literature 1 describes an overcurrent protection circuit configured to add and subtract predetermined numerical values in accordance with detected current values, and turn OFF a semiconductor switch to limit load current when the total value of addition and subtraction exceeds a first determination threshold. The overcurrent protection circuit turns ON the semiconductor switch to cancel limitation of the load current when the total value of addition and subtraction decreases to reach a second determination threshold less than the first determination threshold. Further, the overcurrent protection circuit can execute "retry operation" of turning ON the semiconductor switch and "latch operation" of keeping the semiconductor switch turned OFF when the total value of addition and subtraction decreases to reach the second determination threshold.

SUMMARY

The overcurrent protection circuit described in Patent Literature 1 may be preferred to execute the retry operation in order to quickly recover operation of the load circuit. The retry operation occasionally may be unpreferable depending on circuit properties (for example, inductance of wiring) or an operation state (for example, a short current generation state) of the load circuit. When the overcurrent protection circuit is set to always execute the latch operation, operation of the load circuit may be difficult to be recovered quickly upon an erroneous break due to noise or the like.

It is an object of the present disclosure to provide an overcurrent protection apparatus that is capable of property switching between the retry operation mode and the latch operation mode.

According to one aspect of the present disclosure, an overcurrent protection apparatus that protects, from overcurrent, a load circuit including an electric load and wiring electrically connected with each other is provided. The overcurrent protection apparatus includes: a semiconductor switching element that is configured to control energization to the load circuit; and a breaker that stops the semiconductor switching element upon detection of abnormality of overheat or overcurrent at the semiconductor switching element, the breaker having a latch operation mode of continuously stopping the semiconductor switching element even upon cancellation of abnormality detection, and a retry operation mode of canceling stoppage of the semiconductor switching element upon the cancellation of the abnormality detection. The breaker is configured to initially operate in the latch operation mode upon the abnormality detection, and then be switched to the retry operation mode after satisfaction of a predetermined condition.

The breaker in the configuration initially operates in the latch operation mode upon the abnormality detection. The breaker in the latch operation mode continuously stops the semiconductor switching element even upon cancellation of the abnormality detection. The breaker is thereafter switched to the retry operation mode after satisfaction of the predetermined condition (for example, elapse of a predetermined period). The stoppage of the semiconductor switching element is then canceled upon cancellation of the abnormality detection.

According to the present configuration, it may be possible to appropriately perform switching between the retry operation mode and the latch operation mode. Specifically, immediately after the abnormality detection until the semiconductor switching element is sufficiently decreased in temperature, it may be possible that the breaker operates in the latch operation mode to continuously stop the semiconductor switching element. After the semiconductor switching element is sufficiently decreased in temperature, it may be possible that the breaker operates in the retry operation mode to cancel the stoppage of the semiconductor switching element.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

An embodiment of the present disclosure will be described with reference to the drawings. Various modifications applicable to the embodiment will be described collectively as modification examples after description of the entire embodiment.

Figure 1:
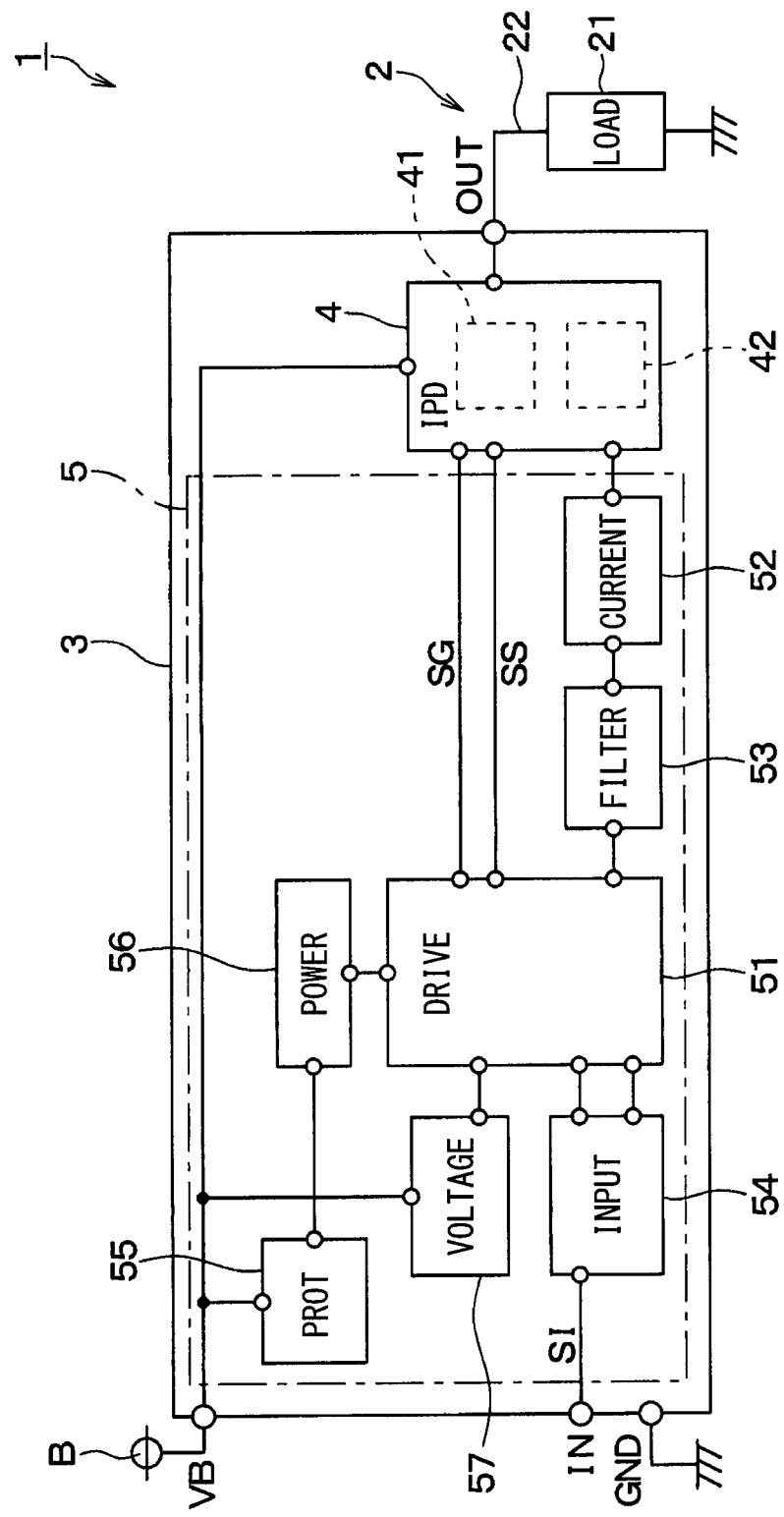
FIG. 1 is a block diagram depicting a schematic circuit configuration of a load drive system including an overcurrent protection apparatus according to an embodiment.

With reference to FIG. 1, a load drive system 1 includes a load circuit 2 and a control circuit 3. The control circuit 3 includes an intelligent power device 4 (hereinafter, abbreviated as the "IPD 4"), and a device drive circuit 5. The respective parts will be described below in terms of their configurations.

The load circuit 2 includes an electric load 21 and wiring 22 electrically connected with each other. Specifically, the electric load 21 is electrically connected to an output terminal OUT of the control circuit 3 via the wiring 22 serving as a wire harness. The control circuit 3 includes an input terminal IN electrically connected to an ECU not depicted. The ECU stands for the electronic control unit. The control circuit 3 includes a power terminal VB electrically connected to a power supply B. The control circuit 3 includes a ground terminal GND that is grounded.

The control circuit 3 is configured to control drive of the load circuit 2 in accordance with a control signal SI received from the ECU not depicted. The control circuit 3 according to the present embodiment, configuring an overcurrent protection apparatus, is configured to protect the load circuit 2 from overcurrent.

The IPD 4 is electrically connected to the load circuit 2 via the output terminal OUT. The IPD 4 is also electrically connected to the device drive circuit 5. The IPD 4 is provided to control energization to the load circuit 2 in accordance with various signals (for example, a drive control signal SG) received from the device drive circuit 5. Specifically, the IPD 4 includes a semiconductor switching element 41 and an element protector 42.

The semiconductor switching element 41 is a power semiconductor element such as a MOSFET or an IGBT having a switching function, and includes a control terminal (for example, a gate terminal), a power supply terminal (for example, a drain terminal), and a load terminal (for example, a source terminal). The control terminal of the semiconductor switching element 41 is electrically connected to the device drive circuit 5. The power supply terminal of the semiconductor switching element 41 is electrically connected to the power terminal VB. The load terminal of the semiconductor switching element 41 is electrically connected to the output terminal OUT. The semiconductor switching element 41 is configured to switch an energization state (ON) and an electrically breaking state (OFF) between the power supply terminal and the load terminal in accordance with the drive control signal SG received by the control terminal.

The IPD 4 has an overheat protective function and/or an overcurrent protective function. The element protector 42 according to the present embodiment, configuring a breaker or a breaking part, is configured to stop the semiconductor switching element 41 when abnormality of overheat or overcurrent at the IPD 4 is detected.

Specifically, the element protector 42 has a latch operation mode of continuously stopping the semiconductor switching element 41 even upon cancellation of abnormality detection, and a retry operation mode of canceling a stoppage of the semiconductor switching element 41 upon cancellation of abnormality detection. The element protector 42 is configured to initially operate in the latch operation mode upon abnormality detection, and subsequently be switched to the retry operation mode after satisfaction of a predetermined condition in accordance with a switching signal SS received from the device drive circuit 5.

For example, a conventional power device is configured to activate a protective function and have the protective function to be latched for a predetermined period upon detection of overheat or overcurrent while the drive control signal SG is ON. This type of the power device may have a latch cancellation condition of turning off the drive control signal SG or inputting a restart trigger signal. The IPD 4 may be produced on the basis of a known technique. Specifically, a power device available from a power device manufacturer may be adoptable as the IPD 4 according to the present embodiment.

The device drive circuit 5 includes a drive controller 51, a current value acquisition part 52, a filter circuit 53, an input circuit 54, a protective circuit 55, a power supply circuit 56, and a voltage detection circuit 57. The drive controller 51 is electrically connected to the IPD 4 so as to transmit the drive control signal SG and the switching signal SS to the IPD 4. The drive controller 51 is electrically connected to the IPD 4 via the current value acquisition part 52 and the filter circuit 53 so as to acquire an energization state of load current from the IPD 4 to the electric load 21 via the wiring 22.

The drive controller 51 is provided to transmit the drive control signal SG to the IPD 4 in accordance with the control signal SI received by the input terminal IN of the control circuit 3. The drive controller 51 according to the present embodiment, configuring a switcher or a switching part, is provided to transmit, to the element protector 42, the switching signal SS for switching between the latch operation mode and the retry operation mode upon satisfaction of the predetermined condition. The "predetermined condition" will be described later.

The drive controller 51 according to the present embodiment, configuring a wire protector, is further configured to acquire an "added/subtracted value" in accordance with each energization state of the load current, and acquire an "integrated value" by integrating the added/subtracted values. The drive controller 51 switches OFF the drive control signal SG even when the control signal SI is ON when the integrated value increases and reaches a predetermined "determination threshold", to stop the semiconductor switching element 41.

The current value acquisition part 52 according to the present embodiment, configuring an energization state acquisition part, is provided to acquire, from the IPD 4, an electric signal corresponding to the energization state of the load current. In an exemplary case where the IPD 4 is configured to output sense current corresponding to 1/N (N>1) times of the load current, the current value acquisition part 52 has a current-voltage conversion function of converting the sense current received from the IPD 4 to voltage. The filter circuit 53 is provided to remove a noise component (for example, a high-frequency noise component) in the electric signal outputted from the current value acquisition part 52 and transmit the electric signal not including the noise component to the drive controller 51.

The drive controller 51 is electrically connected to the input terminal IN via the input circuit 54. The drive controller 51 is also electrically connected to the power terminal VB via the protective circuit 55 and the power supply circuit 56. The protective circuit 55 has ordinary abnormal voltage protective functions as an overvoltage protective circuit configured to suppress application of overvoltage to the drive controller 51, as a reverse connection protective circuit configured to prevent application of abnormal power supply voltage to the drive controller 51 due to reverse connection of the power supply B, and the like. The power supply circuit 56 is provided to generate power supply voltage for operation of the drive controller 51, and the like.

The voltage detection circuit 57 is disposed between the power terminal VB and the drive controller 51. The voltage detection circuit 57 is connected to an AD converter input terminal of the drive controller 51 so as to transmit, to the drive controller 51, a signal corresponding to power supply voltage received by the power terminal VB.

The device drive circuit 5 includes a basic configuration apart from a main part disclosed herein (that is, a part relevant to output of the switching signal SS), and the basic configuration may be similar to those described in JP 2013-62976 A, JP 2013-85443 A, U.S. Pat. No. 9,225,158, and CN 103001202 A. As to specific description of the basic configuration, description of these publications can thus appropriately be incorporated by reference.

Figure 2:
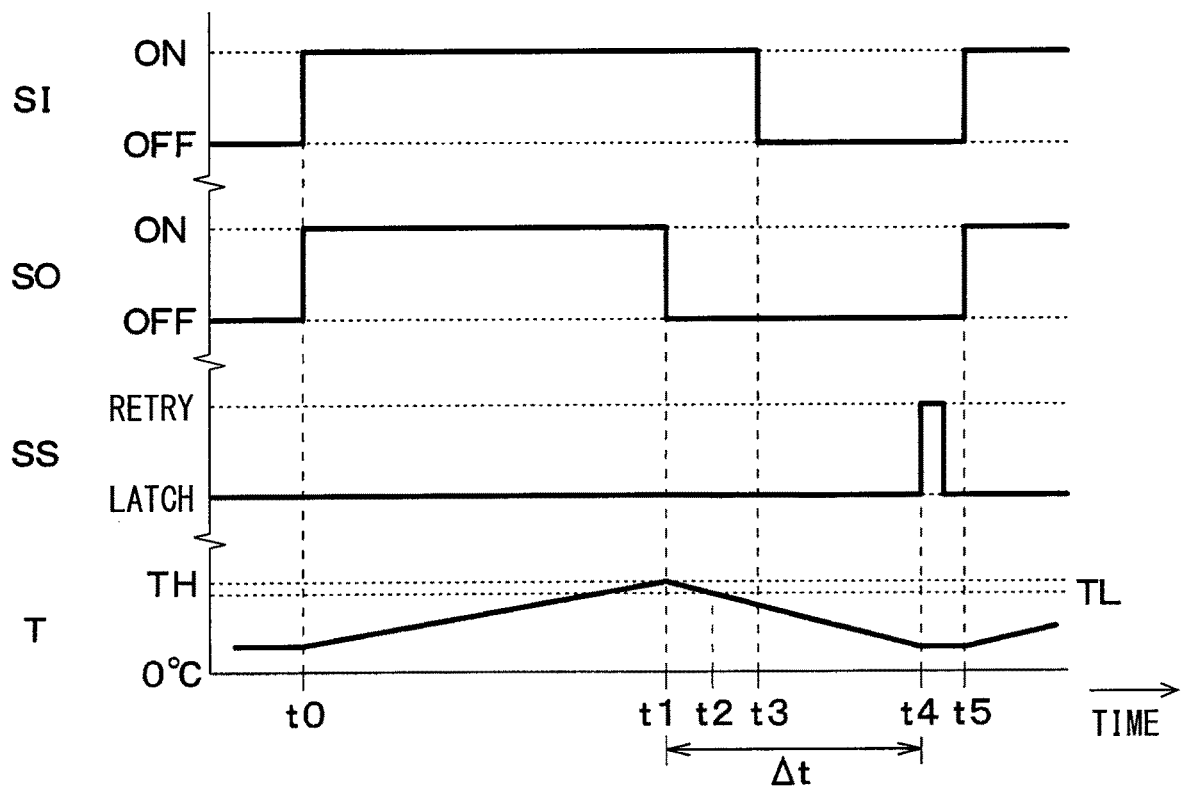
FIG. 2 is a timing chart illustrating outlined operation of the load drive system depicted in FIG. 1.
Figure 3:
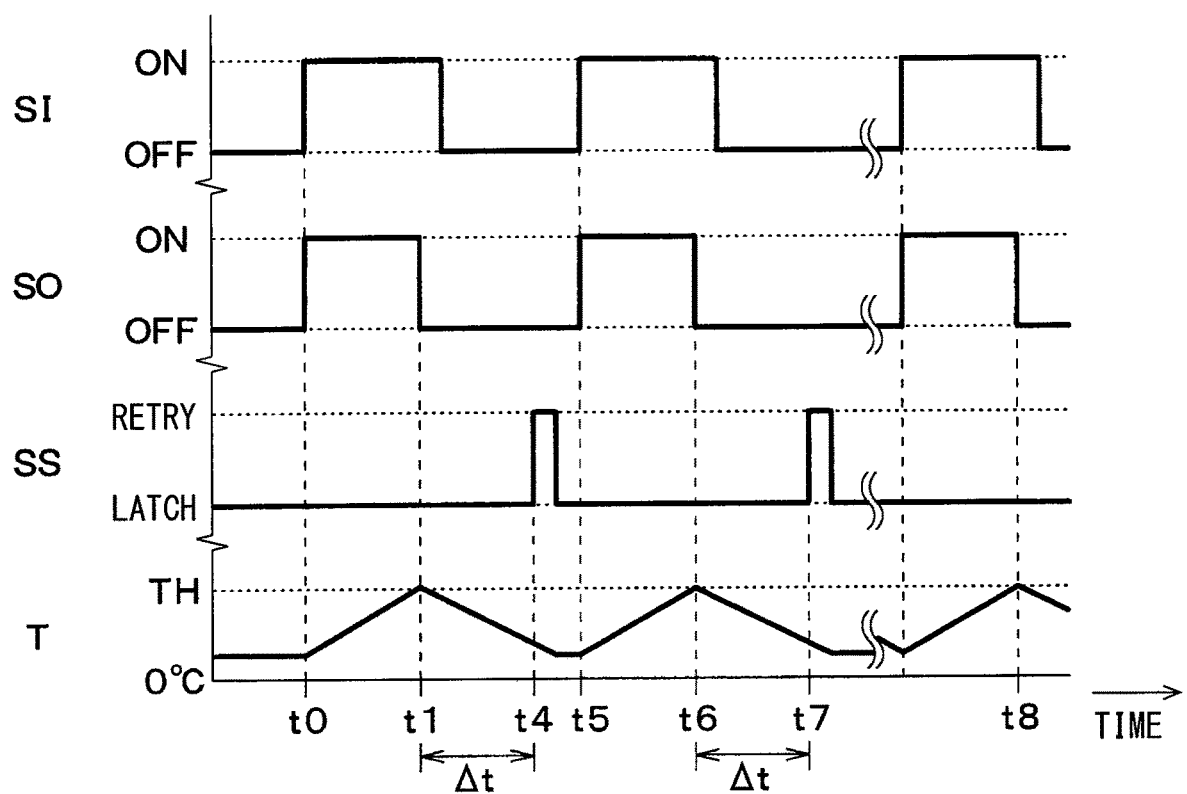
FIG. 3 is a timing chart indicating another example of the outlined operation of the load drive system depicted in FIG. 1.
Figure 4:
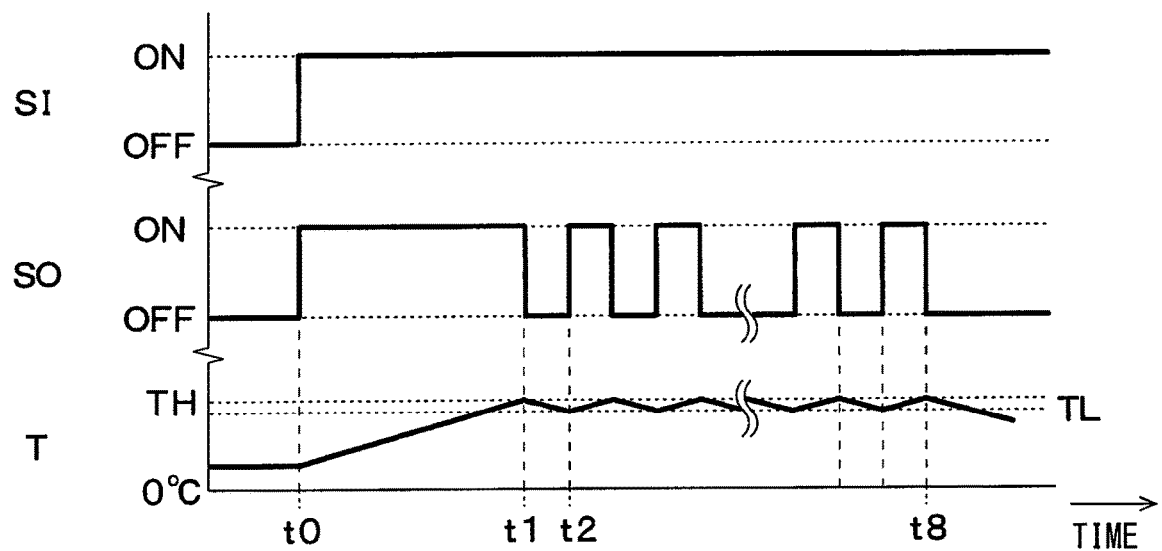
FIG. 4 is a timing chart according to a comparative example.
Figure 5:
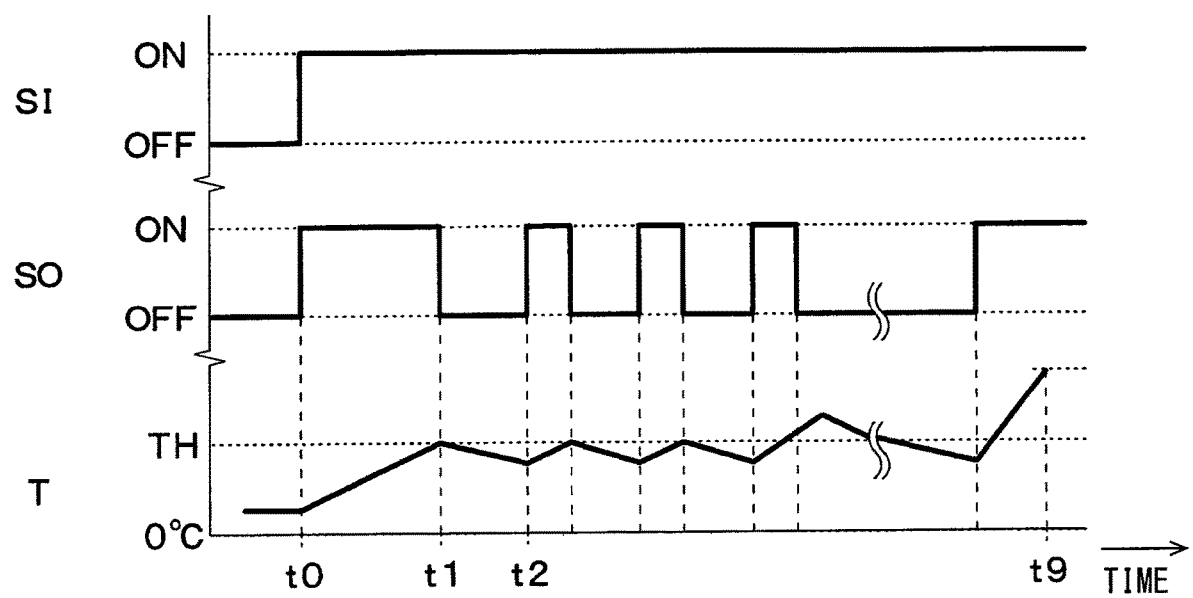
FIG. 5 is a timing chart according to another comparative example.

FIG. 2 and FIG. 3 are timing charts of operation of the load drive system 1 according to the present embodiment. FIG. 4 and FIG. 5 are timing charts of a case where the control circuit 3 (that is, the element protector 42 according to the present embodiment) is fixed in the retry operation mode.

The timing charts include reference sign "SI" indicating the control signal SI, and reference sign "SO" indicating ON/OFF of the semiconductor switching element 41. As described above, overheat protection and/or overcurrent protection of the IPD 4 is executed by the element protector 42 included in the IPD 4 in the present embodiment. The control signal SI is thus substantially consistent with the drive control signal SG in the present embodiment. In these timing charts, reference sign "SS" denotes the switching signal SS. Furthermore, reference sign "T" denotes element temperature, specifically, temperature of the IPD 4. These timing charts and description thereof disregard "delay" normally caused in control, for simplification of depiction and the description.

The control signal SI outputted from the ECU (not depicted) is received by the input terminal IN of the control circuit 3. The drive controller 51 generates a drive control signal SG in accordance with the control signal SI and transmits the generated signal to the IPD 4. The IPD 4 turns ON or OFF the semiconductor switching element 41 in accordance with the drive control signal SG thus received. The present configuration achieves control of the energization state of the load current flowing from the power supply B to the load circuit 2 via the IPD 4.

During this period, the element protector 42 monitors current flowing to the semiconductor switching element 41 and/or temperature of the IPD 4, to achieve overheat protection and/or overcurrent protection of the IPD 4. Meanwhile, the drive controller 51 acquires the added/subtracted value and the integrated value in accordance with the energization state of the load current, to achieve protection of the wiring 22 from overcurrent.

When the load circuit 2 has overcurrent, the IPD 4 also receives overcurrent. As indicated in FIG. 2, element temperature T gradually increases after the semiconductor switching element 41 is turned ON at time t0 in this case. When the element temperature T reaches break temperature TH at time t1, the element protector 42 initially operates in the latch operation mode. In other words, the element protector 42 operating in the latch operation mode stops the semiconductor switching element 41.

When the semiconductor switching element 41 is forcibly turned OFF due to the element temperature having reached the break temperature TH at the time t1, the element temperature T is then gradually decreased by heat radiation. Note that the element protector 42 is operating in the latch operation mode. Even when the element temperature T reaches retry allowable temperature TL slightly lower than the break temperature TH at time t2, the semiconductor switching element 41 is thus kept stopped. The latch operation mode is not reset but is kept even when the control signal SI is switched from the ON state to the OFF state at time t3.

The element temperature T is sufficiently low at time t4 after elapse of a predetermined period Δt from the time t1 when abnormality is detected and the semiconductor switching element 41 is forcibly turned OFF. The drive controller 51 thus switches the element protector 42 to the retry operation mode in accordance with the switching signal SS. This cancels the forcible stoppage of the semiconductor switching element 41. In other words, the semiconductor switching element 41 can be turned ON when the drive control signal SG is turned ON along with the control signal SI switched to the ON state. Before time t5 when the control signal SI is turned ON again, the drive controller 51 sets the element protector 42 to the latch operation mode again in accordance with the switching signal SS.

The timing chart in FIG. 3 relates to a case where the operation indicated in the timing chart of FIG. 2 is repeated multiple times. The time t0 to the time t5 are similar to those described with reference to the timing chart in FIG. 2. As indicated in FIG. 3, when the element temperature T reaches the break temperature TH again at time t6, the element protector 42 operates in the latch operation mode to stop the semiconductor switching element 41 again. The element protector 42 is then switched to the retry operation mode at time t7 after elapse of the predetermined period Δt from the time t6.

The wiring 22 occasionally has gradually increasing temperature while the above operation is repeated. In this case, the drive controller 51 determines that the integrated value has reached the determination threshold at time t8 when the control signal SI is ON. The drive controller 51 then forcibly stops the semiconductor switching element 41 even in a state where the control signal SI or the drive control signal SG is ON and the element protector 42 is not detecting abnormality.

In another case where the element protector 42 is fixed to the retry operation mode, the semiconductor switching element 41 is turned ON again when the element temperature T decreases to the retry allowable temperature TL at the time t2 as indicated in FIG. 4. The element temperature T then increases again. The semiconductor switching element 41 is turned OFF again when the element temperature T reaches the break temperature TH again.

The wiring 22 may occasionally have gradually increasing temperature while the semiconductor switching element 41 is turned ON and OFF repeatedly. In this case, the drive controller 51 determines that the integrated value has reached the determination threshold at the time t8. The drive controller 51 then forcibly stops the semiconductor switching element 41 even in a state where the control signal SI or the drive control signal SG is ON and the element protector 42 is not detecting abnormality.

Depending on circuit properties (for example, inductance of the wiring 22) or an operation state (for example, a short current generation state) of the load circuit 2, the semiconductor switching element 41 may rapidly be increased in temperature while the element protector 42 is operating in the retry operation mode as indicated in the timing chart of FIG. 5 (see time t9 in FIG. 5). The element protector 42 according to the present embodiment is in the latch operation mode at and after the time t1, and thus has no energization causing such rapid increase in temperature.

As described above, the element protector 42 according to the present embodiment, configuring the breaker, initially operates in the latch operation mode upon abnormality detection. The element protector 42 operating in the latch operation mode continuously stops the semiconductor switching element 41 even upon cancellation of abnormality detection. The element protector 42 is then switched to the retry operation mode after satisfaction of the predetermined condition (specifically, elapse of the predetermined period Δt). The stoppage of the semiconductor switching element 41 is thus canceled upon cancellation of abnormality detection. Operation of the load circuit 2 can thus be recovered quickly even upon an erroneous break due to noise or the like.

As described above, the present embodiment achieves appropriate switching between the retry operation mode and the latch operation mode. Specifically, immediately after abnormality detection until sufficient decrease in temperature of the semiconductor switching element 41, it may be possible that the element protector 42 operates in the latch operation mode to continuously stop the semiconductor switching element 41. After the semiconductor switching element 41 is sufficiently decreased in temperature, it may be possible that the element protector 42 operates in the retry operation mode to cancel the stoppage of the semiconductor switching element 41 and recover operation of the load circuit 2.

(Modifications)

The present disclosure is not limited to the specific exemplification described in the above embodiment. Specifically, the above embodiment can be modified where appropriate. Typical modification examples will be described below. The following description of the modification examples will refer only to differences from the above embodiment. Identical or equivalent parts in the above embodiment and the modification examples are denoted by identical reference signs. As to the constituent elements denoted by the reference signs identical to those in the above embodiment, the description of the above embodiment can thus appropriately be incorporated by reference in the following description of the modification examples, unless technical inconsistency or particularly additional description.

The present disclosure is not limited to the specific configurations described in the above embodiment. For example, the IPD 4 can alternatively be configured to output voltage corresponding to current flowing to the semiconductor switching element 41. Specifically, the IPD 4 can be configured to output voltage by a shunt resistance or drain-source voltage. The current value acquisition part 52 is not necessarily provided in this case.

The function of the element protector 42 can be held by the drive controller 51 in place of or in addition to the IPD 4. Specifically, the drive controller 51 can have functions corresponding to those of the breaker and the wire protector so as to be configured to protect the load circuit 2 and the semiconductor switching element 41 from overcurrent. The timing charts in FIG. 2 and the like indicate the signal SO that is substantially consistent with the drive control signal SG.

The drive controller 51 can be configured as a so-called microcomputer including a CPU, a ROM, a rewritable ROM, a RAM, and the like not depicted. In this case, the drive controller 51 is configured to cause the CPU to read out and execute a program stored in the ROM or the rewritable ROM so as to achieve the operation described above. The rewritable ROM in the drive controller 51 is provided to further store a table for acquisition of the added/subtracted value, a table for acquisition of an initial value of the integrated value and the determination threshold, and the like. The RAM in the drive controller 51 is provided to store results of the added/subtracted value and the integrated value thus acquired.

The control circuit 3 including the drive controller 51 can be configured as a digital circuit or an application specific integrated circuit (ASIC) such as a gate array. The control circuit 3 configured as the digital circuit is exemplified in JP 2011-182604 A (corresponding to U.S. Pat. No. 8,441,767, DE 102011000897 A, and CN 102195264 A), JP 2013-62976 A (corresponding to US 2013/0063850 A, and CN 103001202 A), and the like.

The present disclosure is not limited to the specific operation aspect described in the above embodiment. For example, with reference to FIG. 2, the switching signal SS can be switched from the "retry" state to the "latch" state after the time t4 in synchronization with the control signal SI rising from the OFF state to the ON state (see the time t5).

The "predetermined condition" is not limited to elapse of the predetermined period. Examples of the "predetermined condition" include a state where the IPD 4 and the semiconductor switching element 41 have temperature exceeding predetermined temperature. Specifically, in the exemplary operation described above, elapse of the predetermined period Δt can be replaced with switching the element protector 42 to the retry operation mode in accordance with the detected element temperature T.

The "retry operation mode" is not limited to the operation mode of canceling a stoppage of the semiconductor switching element 41 immediately after cancellation of abnormality detection. Specifically, the "retry operation mode" can also be referred to as a "latch cancellation mode" in which the "latch operation mode" is canceled. In this case, "switching to the retry operation mode" after satisfaction of the predetermined condition can also be referred to as "cancellation of the latch operation mode".

Figure 6:
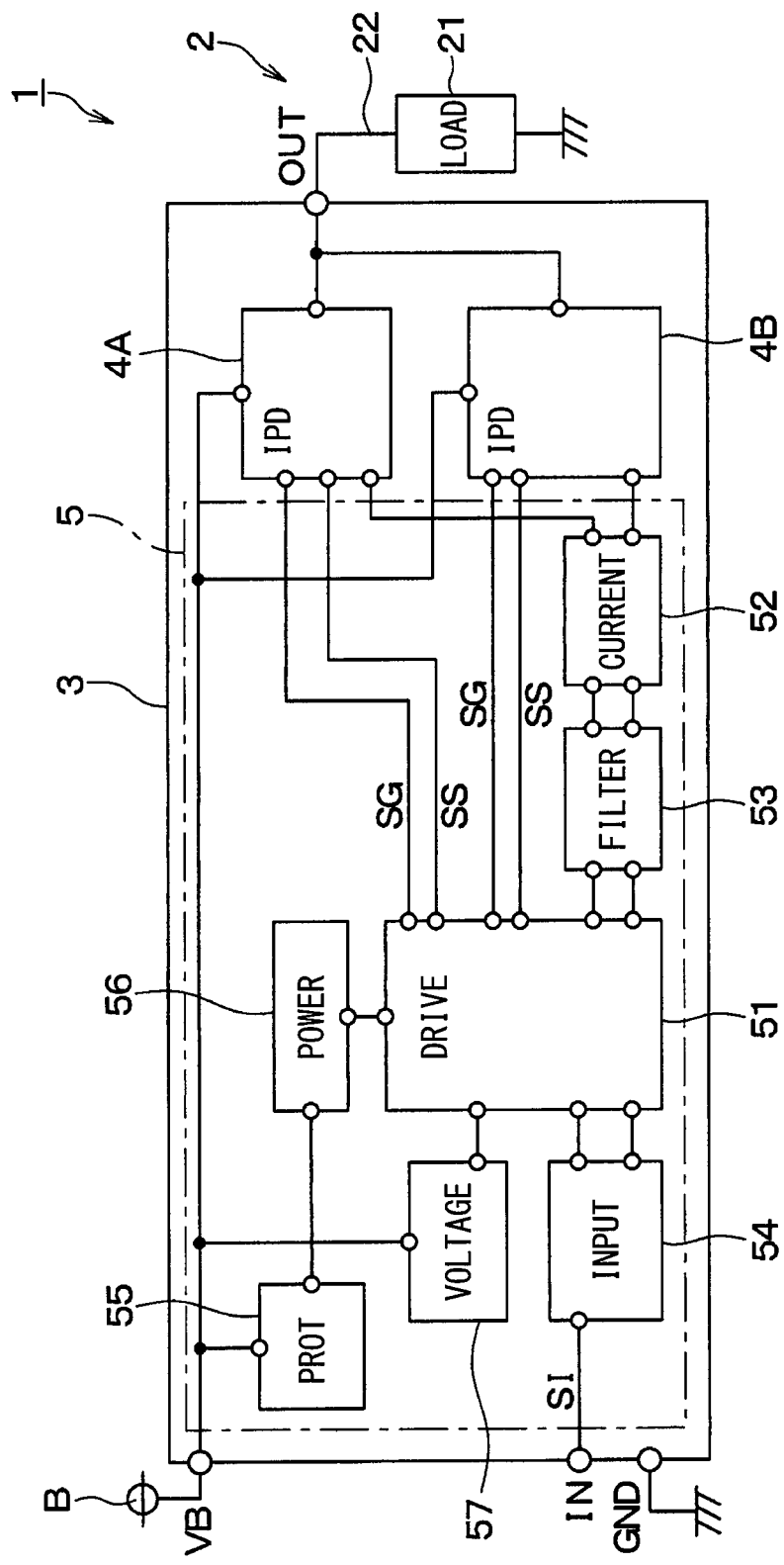
FIG. 6 is a block diagram depicting a schematic circuit configuration of a load drive system including an overcurrent protection apparatus according to a modification example.

The control circuit 3 optionally includes multiple IPDs 4. FIG. 6 exemplifies a typical case where two IPDs 4A and 4B are provided in parallel with each other. Specifically, the two IPDs 4A and 4B are disposed between the drive controller 51 and the output terminal OUT and are electrically connected in parallel with each other. The two IPDs 4A and 4B are electrically connected in parallel with each other to the current value acquisition part 52.

Figure 7:
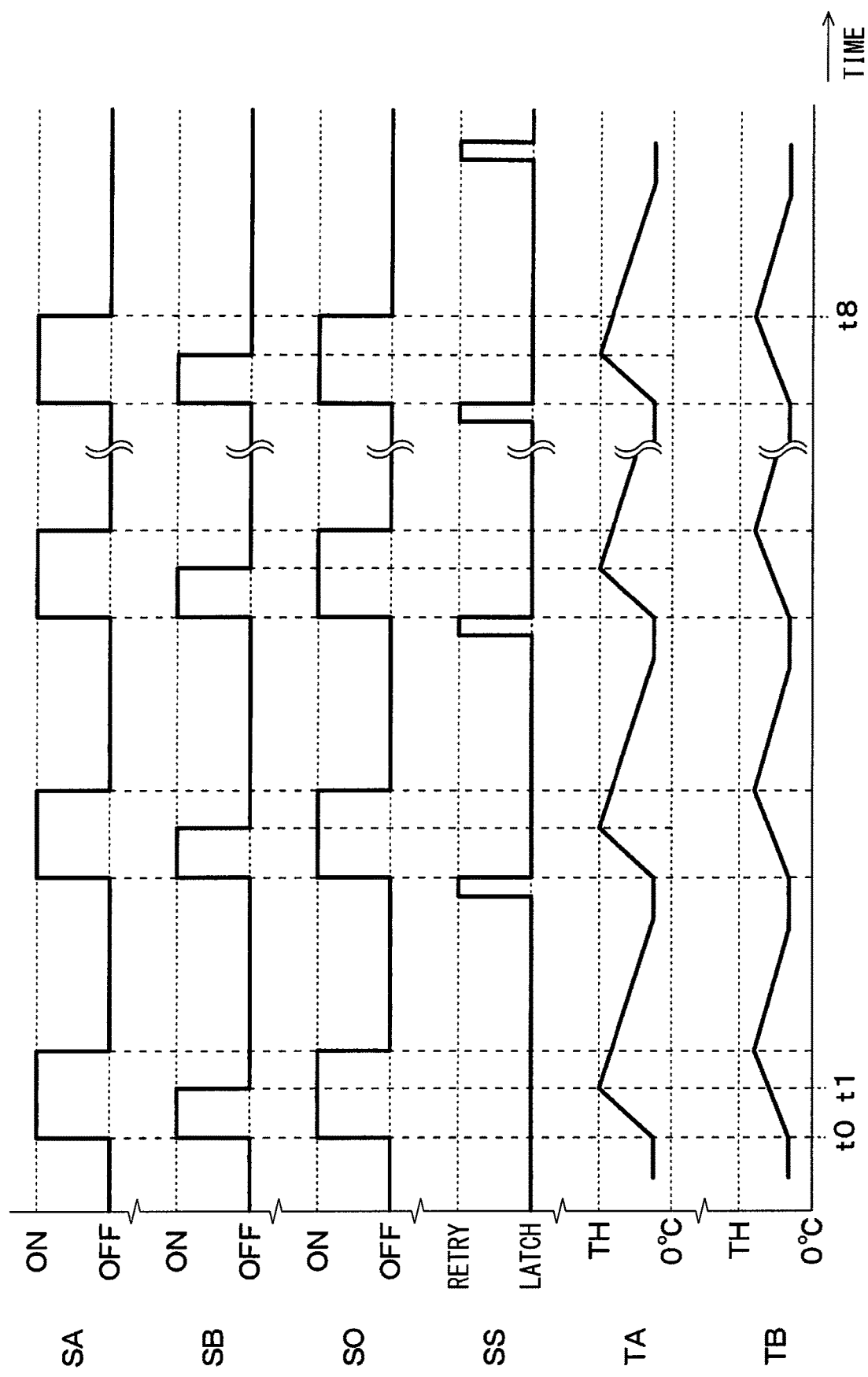
FIG. 7 is a timing chart indicating outlined operation of the load drive system depicted in FIG. 6.

FIG. 7 indicates outlined operation of the configuration depicted in FIG. 6. In the timing chart of FIG. 7, reference sign "SA" and reference sign "SB" denote control signals SI corresponding to the IPDs 4A and 4B, respectively. Furthermore, reference sign "TA" and reference sign "TB" denote element temperature corresponding to the IPDs 4A and 4B, respectively.

As indicated in FIG. 7, when either one of the two IPDs 4A and 4B (the IPD 4A exemplified in FIG. 7) according to the present modification example has the element temperature T having reached the break temperature TH, the semiconductor switching element 41 in each of the IPDs 4A and the like is forcibly turned OFF and is kept stopped until the switching signal SS is received. The stoppage of the semiconductor switching element 41 in each of the IPDs 4A and the like is canceled upon receipt of the switching signal SS. When the drive controller 51 has the integrated value reaching the determination threshold at the time t8, the drive controller 51 forcibly stops the semiconductor switching element 41 in order to protect the load circuit 2 or the wiring 22.

The modification examples are not limited to those exemplified above. Furthermore, some of the modification examples can be combined appropriately. Moreover, entirety or part of the above embodiment can be combined with entirety or part of any one of the modification examples.

While the embodiments, the configurations, the aspects of an overcurrent protection apparatus have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. An overcurrent protection apparatus that protects, from an overcurrent, a load circuit including an electric load and a wiring electrically connected with each other, the overcurrent protection apparatus comprising:
   a semiconductor switching element that is configured to control energization to the load circuit;
   a breaker that stops the semiconductor switching element upon detection of abnormality of an overheat or the overcurrent at the semiconductor switching element, the breaker having a latch operation mode of continuously stopping the semiconductor switching element even upon cancellation of the abnormality detection, and a retry operation mode of canceling stoppage of the semiconductor switching element upon the cancellation of the abnormality detection;
   a switcher that is configured to transmit, to the breaker, a switching signal for switching between the latch operation mode and the retry operation mode upon the satisfaction of a predetermined condition;
   an energization state acquisition part that is configured to acquire an energization state of the wiring; and
   a wire protector that is configured to stop the semiconductor switching element based on the energization state, which is acquired, wherein
   the breaker is configured to initially operate in the latch operation mode upon the abnormality detection, and then be switched to the retry operation mode after satisfaction of the predetermined condition.

2. The overcurrent protection apparatus according to claim 1, wherein
   the predetermined condition includes an elapse of a predetermined period.

3. The overcurrent protection apparatus according to claim 1, further comprising:
   an intelligent power device that includes the semiconductor switching element and the breaker, the intelligent power device being electrically connected to the load circuit; and
   a device drive circuit that includes the switcher, the energization state acquisition part, and the wire protector, the device drive circuit being electrically connected to the intelligent power device to transmit, to the intelligent power device, a drive control signal controlling a drive of the semiconductor switching element.

* * * * *